United States Patent [19]

Rummler

[11] Patent Number: 5,447,630
[45] Date of Patent: Sep. 5, 1995

[54] MATERIALS TREATMENT PROCESS AND APPARATUS

[76] Inventor: John M. Rummler, 230 Maplewood Ave., Portsmouth, N.H. 03801

[21] Appl. No.: 53,402

[22] Filed: Apr. 28, 1993

[51] Int. Cl.⁶ .................... C02F 1/38; C02F 1/461; C02F 11/10

[52] U.S. Cl. .................... 210/186; 210/192; 210/205; 210/257.1; 210/259; 210/512.1; 210/407; 210/769; 204/149; 204/229; 204/306; 40/185; 40/221; 40/223; 40/290

[58] Field of Search ............... 204/149, 229, 306; 210/186, 512.1, 512.2, 407, 769, 791, 196, 128, 192, 101, 205, 257.1, 259; 110/185, 221, 223, 289, 290

[56] References Cited

U.S. PATENT DOCUMENTS

| | | |
|---|---|---|
| 506,879 | 10/1893 | Jewell . |
| 506,880 | 10/1893 | Jewell . |
| 1,224,913 | 5/1917 | Fergusen . |
| 1,303,358 | 5/1919 | Montgomery . |
| 2,566,731 | 9/1951 | Komline .................. 110/185 |
| 2,735,547 | 2/1956 | Vissac .................... 210/90 |
| 3,277,580 | 10/1966 | Tooby . |
| 3,495,648 | 2/1970 | Amadon . |
| 3,523,076 | 8/1970 | Goerz, Jr. et al. . |
| 3,568,838 | 3/1971 | Saltsjobaden et al. . |
| 3,629,099 | 12/1971 | Gahmberg et al. . |
| 3,655,048 | 4/1972 | Pergola . |
| 3,659,714 | 5/1972 | Valdespino . |
| 3,670,891 | 6/1972 | Allen . |
| 3,677,404 | 7/1972 | Staffin . |
| 3,692,186 | 9/1972 | Marzocchi . |
| 3,700,565 | 10/1972 | Cornish et al. . |
| 3,829,909 | 8/1974 | Rod et al. . |
| 3,831,288 | 8/1974 | Stribling et al. . |
| 3,864,258 | 2/1975 | Richardson et al. . |
| 3,922,730 | 12/1975 | Kemper . |
| 4,009,104 | 2/1977 | Behrendt et al. .................. 210/192 |
| 4,019,021 | 4/1977 | Schladitz . |
| 4,044,696 | 8/1977 | Marincek . |
| 4,097,381 | 6/1978 | Ritzler . |
| 4,219,415 | 8/1980 | Nassef et al. . |
| 4,222,130 | 9/1980 | Roberts . |
| 4,237,006 | 12/1980 | Colman et al. .................. 210/512.1 |
| 4,313,233 | 2/1982 | Roberts . |
| 4,378,289 | 3/1983 | Hunter .................. 210/512.1 |
| 4,439,317 | 3/1984 | Jarrell . |
| 4,439,321 | 3/1984 | Taki et al. . |
| 4,492,635 | 1/1985 | Stigerbrandt . |
| 4,547,917 | 10/1985 | Akesson . |
| 4,592,291 | 6/1986 | Sullivan, III .................. 110/221 |
| 4,631,133 | 12/1986 | Axelrod . |
| 4,889,639 | 12/1989 | Hudgins et al. . |
| 5,037,560 | 8/1991 | Gayman . |
| 5,108,608 | 4/1992 | Carroll .................. 210/512.1 |
| 5,145,576 | 9/1992 | Lataillade . |
| 5,185,087 | 2/1993 | Lister et al. .................. 210/512.1 |
| 5,191,184 | 3/1993 | Shin .................. 110/250 |

FOREIGN PATENT DOCUMENTS

| | | |
|---|---|---|
| 0338626 | 10/1989 | European Pat. Off. . |
| 3509215 | 9/1986 | Germany . |
| 2222095 | 2/1990 | United Kingdom . |

OTHER PUBLICATIONS

Chemical Engineering, vol. 84, No. 3, pp. 77-78, Jan. 31, 1977, Anon, "Wastewater System Uses Microwaves".

Primary Examiner—Matthew O. Savage
Attorney, Agent, or Firm—Oblon, Spivak, McClelland, Maier & Neustadt

[57] ABSTRACT

A waste treatment system in which incoming waste is initially separated by a separator into solid and liquid components, without significantly emulsifying the solid components. The separator requires no energy to provide a solid waste component having a very small amount of liquid therein. The solid waste is then incinerated in a microwave reactor chamber which requires little energy, and which results in an extremely small amount of resulting ash, on the order of 0.1% of the incoming solid volume, with the solid treatment requiring little energy as a result of the effective separation accomplished by the separator. Optionally, a liquid treatment module can also be provided for removing any suspended solid remnants from the liquid component exiting the separator, with the liquid treatment module separating any suspended solids from the liquid component. The solid remnants removed from the liquid are also incinerated, with the liquid then subjected to further processing and purification.

22 Claims, 8 Drawing Sheets

MATERIALS TREATMENT PROCESS AND APPARATUS

BACKGROUND OF THE INVENTION

1. Field of the Invention

The invention relates to a method and apparatus for treating materials, particularly materials such as sewage or other waste effluents. In particular, the invention provides a waste treatment process and apparatus in which a high degree of separation is initially provided for separating solid and liquid components, with the solid component thereafter incinerated with little or no resulting solid waste product remnants. The method and apparatus also includes an optional system for treatment of the liquid component such that the discharged liquid is more environmentally acceptable.

2. Discussion of Background

Due to overly-burdened sewage systems, increased costs associated with waste disposal, and heightened awareness of environmental issues, improved waste treatment systems/processes are greatly needed. For example, in the treatment of household sewage, waste water and associated solids are typically treated in two ways: (1) municipal sewage systems which lead to a central treatment plant; and (2) localized in-ground anaerobic leach fields or cesspools off septic tanks. However, such systems have extremely large volume requirements, and provide less than optimal by-products from an environmental standpoint.

U.S. Pat. No. 4,631,133 proposes an alternative waste treatment arrangement in which sewage passes through a filter, with solid waste material trapped in the filter. A heating element and microwave generator then dry the solid material and burn or incinerate the solids. However, such an arrangement is considerably less than optimal, since the entire sewage volume must pass through the filter, thereby severely limiting the volume capacity of the treatment device. In addition, the need for both microwave and auxiliary heat increases the energy requirements of the treatment device, thereby increasing the associated cost of operation as well as diminishing the effectiveness of the device from an environmental standpoint.

Accordingly, improved waste treatment systems and processes are needed. Ideally, a waste treatment system should be capable of reliably handling significant volumes of waste such as sewage, while having low energy requirements, with any resulting end-products environmentally safe. In addition, the system should preferably be capable of on-site installation for a wide variety of applications, thereby eliminating the need for extensive piping and storage systems.

SUMMARY OF THE INVENTION

Accordingly, it is an object of the present invention to provide an improved waste treatment system and process.

It is another object of the present invention to provide a waste treatment system having extremely low energy requirements, thereby improving the cost effectiveness of the device, as well as maintaining the environmental effectiveness.

It is a further object of the present invention to provide a waste treatment system which can be readily installed at the point of discharge or creation of the waste, such as in a household residence, place of business, boat or portable toilet.

It is yet another object of the present invention to provide a waste treatment system and process in which a very high proportion of the solid waste components are initially separated with the solid component having a low liquid content, and with the solid waste thereafter incinerated such that little or no solid waste products remain. The liquid component can be further treated to remove and treat any solid waste remnants, and thereafter treat the liquid such that the final liquid effluent is purified, or at least more environmentally acceptable.

It is yet another object of the present invention to provide an improved separator device for separating components of an incoming flow. In the context of waste treatment, the separator effectively separates liquid and solid components of sewage, such that the exiting solid component includes only a small amount of liquid, thereby enhancing the effectiveness of downstream treatment of particularly the solid waste, and allowing for optional treatment of the liquid waste.

It is a still further object of the present invention to provide a waste treatment system which can be easily installed in new construction, as well as in existing structures within an extremely reasonable amount of time (e.g., four man hours), and with low space requirements (e.g., with a solid treatment module for a residence having a size comparable to that of a washing machine).

These and other objects and advantages are achieved in accordance with the present invention in which waste, such as sewage, is initially introduced into a separator which separates the incoming waste flow into solid and liquid components, such that the solid component includes only a small liquid portion, with the separator requiring no energy. The solid component or fraction is then treated in a microwave reactor chamber which provides an efficient incineration of the solid waste without requiring auxiliary heating, with the incineration particularly effective by virtue of the effectiveness of the separator. In addition, by utilizing a controlled, variable airflow/exhaust flow for the reactor chamber, extremely complete and efficient incineration is attained. Optionally, the liquid component or fraction from the separator is supplied to a liquid treatment module which removes any suspended solid remnants from the liquid, with the solid remnants subjected to a microwave treatment, and with the resulting liquid subjected to additional treatment such as electrolysis and/or disinfection and polishing such that a purified liquid effluent is provided which is suitable for discharge into a municipal sewage system, a waterway, evaporation in a settling pool, or injection into a subsurface percolation/irrigation bed.

Although the various components of the system and process of the present invention are particularly desirable in combination for treating waste such as sewage, it is to be understood that various components or subsystems have advantageous utility for a wide variety of applications, and further, that all components of the system are not required for providing an improved waste treatment system. For example, as will be discussed further hereinafter, the waste treatment system essentially includes a solid treatment module and a liquid treatment module, however, the solid treatment module can be utilized without the liquid treatment module, since separation and treatment of the solid waste components nevertheless provides improved waste handling, such that a discharge of the liquid into, for example, a municipal sewer system is less burdensome on the municipal sewer system.

BRIEF DESCRIPTION OF THE DRAWINGS

A more complete appreciation of the invention and many of the attendant advantages thereof will become readily apparent from the following detailed description, particularly when considered in conjunction with the drawings in which.

DESCRIPTION OF THE PREFERRED EMBODIMENTS

Figure 1:
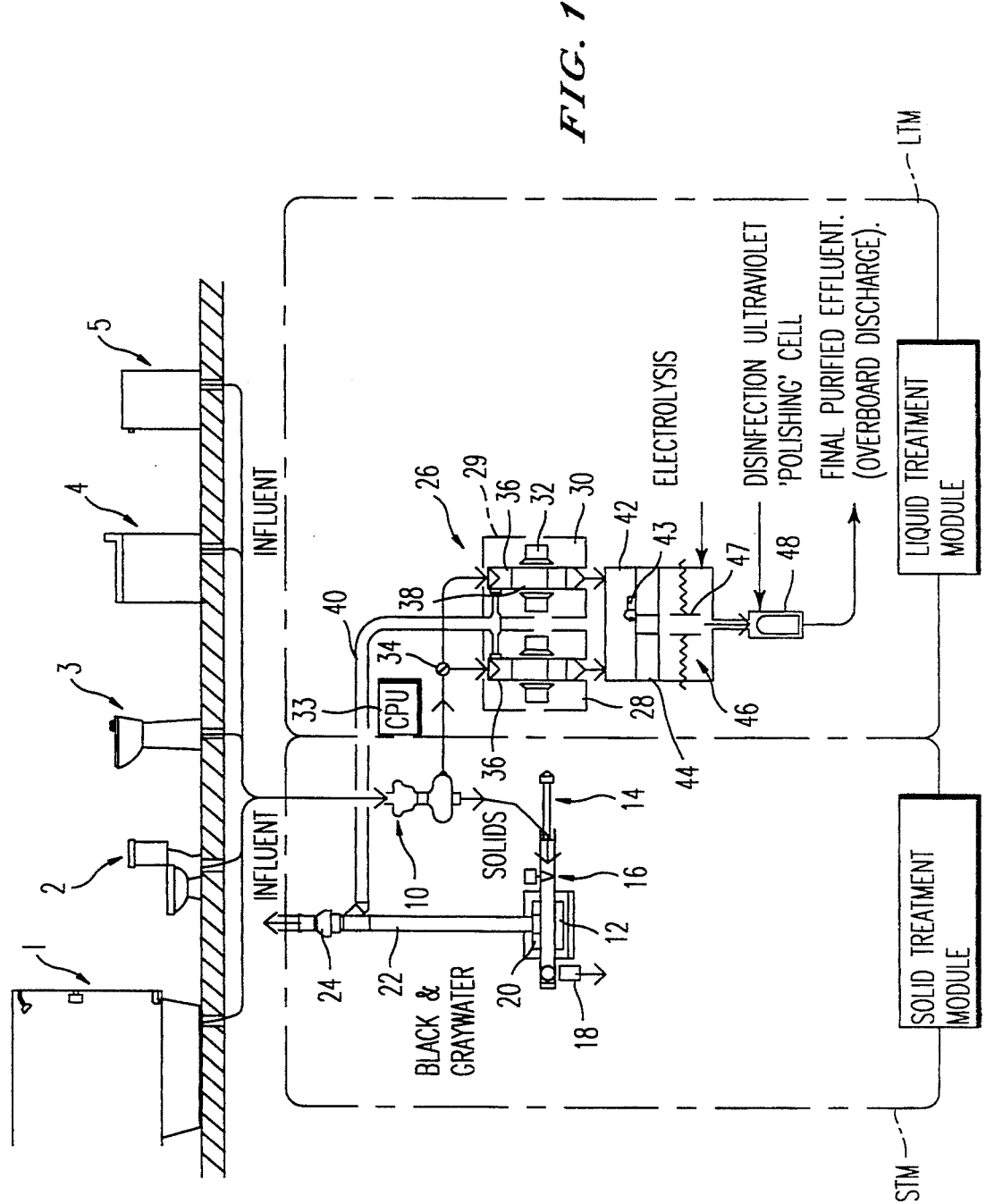
FIG. 1 is an overall schematic of a waste treatment system of the present invention, illustrated in the context of a household residence.

Referring now to the drawings, wherein like reference numerals designate identical or corresponding parts throughout the several views, an initial appreciation of the present invention will become readily apparent from FIG. 1. As shown in FIG. 1, the system can be utilized for handling and treating waste from a variety of sources. In the context of residential use, such sources can include a bathtub or shower 1, toilet 2, lavatory or kitchen sink (which may include a significant amount of vegetable matter associated with a kitchen sink having a garbage disposal) 3, dishwasher 4 and clothes washer 5. It is to be understood that the residential sources shown in FIG. 1 are provided merely as an example, since the system and process of the present invention can be advantageously used in a wide variety of environments which may have different sources of waste, or different proportions of waste, such as in an office building (which may have a greater proportion of toilet waste and little or no waste from bathtubs or clothes washers) or restaurants (which may have a greater proportion of water including vegetable matter).

As discussed earlier, all components of the system are not necessary to provide beneficial waste treatment. In particular, as shown in FIG. 1, the system essentially includes a solid treatment module, STM, demarcated by the section enclosed in broken line at the left of FIG. 1, with a liquid treatment module, LTM, demarcated by the broken line at the right of FIG. 1. If desired, the solid treatment module can be installed without the liquid treatment module, with the system nevertheless being beneficial in providing a less burdensome effluent by virtue of the removal and treatment of the solid waste. As will be readily apparent hereinafter, the STM and LTM can be constructed as modules which can be easily installed, for example in a residence, requiring a relatively small amount of labor, for example on the order of 4 man hours. The separate modular construction of the solid treatment module and liquid treatment module can also be desirable, since the liquid treatment module could be installed subsequent to the solid treatment module as the homeowner's budget allows, or as waste treatment requirements change.

Still referring to FIG. 1, it will be appreciated that all of the influents to the treatment system drain to a common drain, which then enters a separator 10, which will be described in further detail hereinafter. Significantly, the separator 10 requires no energy, but nevertheless effectively separates solid and liquid components, with the solid component treated by the STM, and the liquid component (optionally) treated by the LTM. The solid component contains a very small amount of liquid, however is typically not completely free of liquid, which is actually beneficial, since the presence of a very small portion of liquid allows for more effective utilization of microwave treatment in a microwave reactor chamber 12. However, since the separator 10 is extremely effective in separating the liquid and solid components, excessive energy is not wasted in drying the solid components.

After the solids exit the separator 10, they are periodically fed into the microwave reactor chamber 12 utilizing a feed ram 14, with a motorized ball valve 16 allowing for the intermittent introduction of solids, while preventing backflow of any by-products of the microwave treatment. As shown at 18, an outlet for ash remaining after the microwave treatment can be provided, such that any small portions of ash can be delivered and retained in an ash receptacle. However, in accordance with an unexpected result of the present invention, it has been found that for typical residential use, almost no ash remains for disposal after the microwave treatment, since the combined use of the separator 10 and the microwave treatment has proven to be even more effective than anticipated. For example, in testing the system in a residence having a family of four, only one teaspoon of ash remained after treatment of solid waste for a one month period. The remaining solid or ash after treatment thus amounts to only 0.1% of the influent solid volume or less. Thus, the provision of an ash outlet 18 is optional, however is shown in FIG. 1, since it may be desirable for certain applications.

A ceramic particulate "scrubber" or filter is provided as shown at 20, such that minute airborne ash particles are removed from the exhaust flowing from the reactor chamber 12 to the exhaust vent pipe 22. The exhaust vent 22 can be, for example, a three inch diameter PVC pipe, with the flow rate of the exhaust controlled by a variable speed exhaust fan 24.

As will be discussed hereinafter, in accordance with another significant aspect of the present invention, the flow rate of the exhaust provided by the variable speed exhaust fan 24 is controlled to promote more optimal incineration in the microwave reactor chamber. Thus, during the initial stages of microwave treatment, a lower amount of exhaust flow is provided such that heat can be retained and temperatures increased in the microwave reactor in order to initiate burning or incineration, while after temperatures are sufficient to initiate incineration, the speed of the exhaust fan is increased, thereby increasing the volume flow of the exhaust, and thus increasing the air inflow to-provide sufficient oxygen for optimal and complete incineration. Thus, one of the many significant aspects of the present invention resides in the use of a variable speed exhaust which is controlled in correspondence with the operation of the microwave reactor chamber and the incineration process. Not only does such an arrangement promote more effective incineration such that ash remnants are essentially negligible, but also, the solid treatment module is extremely energy efficient, and supplemental heating elements are not necessary, since the entire incineration process can be accomplished utilizing microwaves. In fact, the energy requirements for the solid treatment module have proven to be even less than was initially anticipated for typical residential use.

Continuing with FIG. 1, the liquid treatment module receives liquids from the separator 10. The liquids will typically include blackwater (i.e., liquids including fecal matter) and graywater (e.g., liquids from kitchen sinks which may include vegetable matter, or liquids from a clothes washer, etc.). Although the separator 10 removes most of the solids from the influent, the black and gray-water includes small particles which are suspended in the liquid such as hair, small vegetable particles, tissue particles and small fecal particles. The small solid remnants are then removed in a dual filter arrangement designated generally by reference numeral 26.

In accordance with another aspect of the present invention, it has been recognized that a pair of liquid treatment filters is desirable since any solid remnants in the liquid can be entrapped in one of the filters, with the entrapped solid or particulate matter periodically subjected to microwave treatment utilizing microwave generators 32. However, during operation of the microwave generators of one of the filter arrangements, e.g. 28, liquid should not be introduced, since introduction of liquid would diminish the effectiveness of the microwave acting upon solid material entrapped in the filter. Perhaps more importantly, introduction of liquid during operation of the microwave generator 32, or even shortly thereafter when the filter arrangement is hot, can cause premature fatigue of the filter arrangement and filter material, and possibly explosion or fire when the waste liquid enters the hot microwave filter arrangement. Thus, during microwave treatment of one filter arrangement 28, the liquid enters the other microwave filter arrangement 30 and vice versa. The microwave generators 32 can be operated utilizing a timer such that the filter arrangements 28, 30 are subjected to microwave treatment periodically, but at different times. A motorized PVC ball valve 34 is provided upstream of the dual filter arrangement 26, thereby ensuring that the filter to which liquid is directed is cool and the microwave generators of that filter unit are not being operated. Since only a small amount of solids are present in the liquid passing into the dual filter unit 26, only a short microwave cycle, for example five minutes per day per filter, is necessary. A central processing unit (CPU) 33 can also be provided for controlling and coordinating operation of the diverter valve 34 and microwave generators 32, as well as other components of the liquid treatment module.

Thus, the provision of two ceramic microwave filter arrangements allows the continuous receipt of liquid waste, while preventing any adverse effects which may result from the introduction of liquid during microwave operation or shortly thereafter. As should be readily understood, the filter units are enclosed utilizing, for example, stainless steel as indicated schematically by broken line 29, to prevent exit of any stray microwaves. Similarly, the microwave reactor chamber 12 for the solid treatment module should be suitably enclosed.

The ceramic liquid filter units include cylindrical, ceramic, microwave transparent casings 36, with ceramic filter material 38 enclosed within the casings 36 for retaining any solid or particulate material therein, while allowing the liquid to pass therethrough. After a given period of use, the solid matter entrapped in the filter material 38 is eliminated by incineration, with any ash remnants thereafter removed by subsequent introduction of liquid passing through the filter material 38. An exhaust vent 40 is provided, which can be operated by the same exhaust fan 24 as the solid treatment module, or a separate fan may also be provided. As discussed earlier, the use of a controlled, variable speed exhaust fan 24 has been recognized as particularly important in providing improved incineration in the solid treatment module. By appropriately sizing the LTM vent pipe 40, adequate control of airflow through the STM can be maintained by the variable speed fan 24 even with vent pipe 40 remaining open, since the air from the pipe 40 can be predicted for a given pipe diameter. Alternatively, a valve could be provided in the pipe 40 during at least part of the STM microwave treatment in order to isolate the controlled airflow through the STM.

The filter media 38 is preferably formed of a ceramic fabric material which entraps solid matter, without being degraded by the microwave treatment, however alternate materials to the ceramic fabric are likely to be possible. Although long-term testing data is not currently available, it is expected that the filters will require little or no replacement, particularly in view of the avoidance of fatigue provided by the diverter valve and dual filter arrangement. In addition, any minute ash remaining after a microwave cycle is flushed from the filter by subsequent introduction of liquid. Since the amount of solids entering the LTM is much less than that entering the STM, smaller microwave generators can be provided in the LTM. For example, in residential use, the STM can utilize 400 Watt magnetrons or microwave generators, while 100 Watt generators are acceptable for the LTM.

Downstream of the dual filter arrangement 26, a cylindrical holding tank 42 is provided, which includes a dosing siphon and electrolysis oxidant cell arrangement. The liquid exiting the dual ceramic filter arrangement 26 enters the holding tank 42 and is retained in an annular inlet reservoir 44 which extends about the inner periphery of the cylindrical tank 42.

A dosing siphon periodically feeds a predetermined amount of liquid from reservoir 44 for treatment by the electrolysis cell arrangement 46, including electrolysis plates 47 which act as oxidation cells, to super-oxygenate the liquid and generate chlorine to purify the liquid. The dosing siphon, indicated schematically at 43, includes a float arrangement such that a metered amount of liquid is dosed to the electrolysis arrangement when the reservoir liquid reaches a certain level. An ST 204 dosing siphon available from Orenco Systems, Inc. has been found suitable for this purpose. Electrolysis arrangements have been used in the past, in large scale facilities. However, prior to the present invention, there did not exist a comprehensive treatment system which provides a liquid suitable for electrolysis on a scale suitable for residential use. Downstream of the holding tank and electrolysis arrangement, an optional disinfection device 48 can be provided which may include, for example, an ultraviolet polishing cell. The final effluent is thus purified, and suitable for discharge into a waterway, for evaporation into a settling pool, or injection into a subsurface percolation/irrigation bed.

Utilizing the optional LTM, liquid effluents are suitable for discharge into waterways, meeting most, if not all, state regulations for such discharges. The liquid could also be utilized for many irrigation purposes. Testing has revealed the liquid to have less than one P.P.M. fecal coli (*Escherichia coli*); less than one P.P.M. suspended solids; turbidity of solids less than one N.T.U.; and no viruses or microorganisms. Chlorine residuals have been measured as 0.24 mg/l-2.75 mg/l, with total organic carbons less than 1 mg/l. It is believed that P.H. and Nitrogen content will vary with differing influents to the system.

Figure 2:
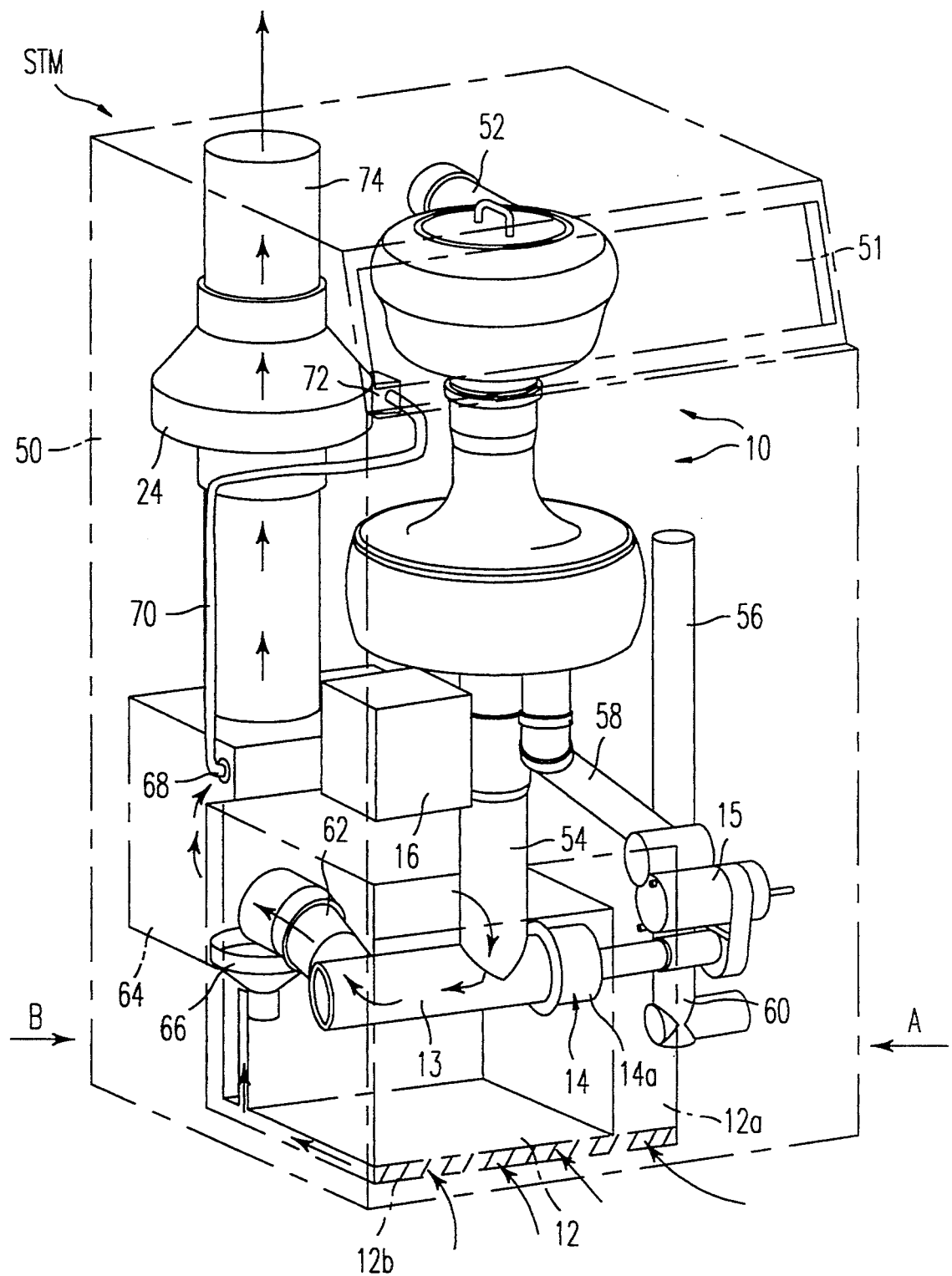
FIG. 2 is a perspective view of a solid treatment module of the present invention.

As discussed earlier, a significant aspect of the present invention resides in the ability to provide a compact system which can be easily installed without requiring vast amounts of labor. Referring now to FIG. 2, it will be appreciated that the solid treatment module STM can be provided within a housing 50 of a size comparable to that of a conventional residential clothes washer. For example, the solid treatment module can be housed within a housing 50 which is approximately three to four feet in height, with a base which is substantially square having a side dimension of approximately 30 inches.

As shown in FIG. 2, the influents enter an inlet 52, with solids exiting the separator unit through pipe 54. The pipes can be formed of stock PVC pipe materials sized, for example, of a three inch nominal diameter. Liquids exit the separator 10 through primary and secondary liquid outlet pipes respectively designated at 56, 58. The liquid pipes 56, 58 then merge to a single pipe 60 which passes out of the housing 50 to, for example, a municipal sewage system, or optionally to a liquid treatment module. As discussed earlier, the solid waste component is fed into a microwave reactor chamber 12, with the solid waste held inside a ceramic fire tube 13 which is microwave transparent. The compartment indicated at 16 houses a motor for a motorized ball valve (with the valve disposed in the adjacent pipe section) for controlling selective feeding of solids toward the reactor chamber 12. A ram actuator 14 is provided, which is operated by a motor 15 and gearbox 14a. The gearbox 14a transforms the rotary output of the motor 15 into reciprocating motion for reciprocating the ram 14 in order to advance the solid waste into the microwave transparent tube 13. A strong ram assembly is particularly important in low-use applications, or where extended periods of non-use can occur, since solids can become hardened over time. A linear actuator available from W. W. Granger Co. (which are commonly used as positioning devices for orienting satellite dishes) has been found to be suitable for this purpose.

The solid waste is then subjected to microwaves which are directed upon the tube 13, such that virtually the entire solid waste is incinerated solely by microwave energy, with any ash remnants trapped by an outlet scrubber or particulate filter 62 provided in the passage between the tube 13 and an exhaust manifold 64. As shown at 66, a funnel-type drain is provided at the base of manifold 64 for collecting any condensate which may form as the exhaust gas exits from the tube 13 and begins cooling. The drain 66 can be connected to the liquid treatment module by a suitable piping arrangement, or may be connected to a municipal sewage system.

As shown at 68, a thermocouple or sensor is provided in the exhaust manifold 64, with suitable coupling 70 connecting the sensor 68 to a speed control 72 for the exhaust fan 24. As discussed earlier, in accordance with one aspect of the present invention, by utilizing a controlled, variable speed exhaust fan 24, more complete and efficient incineration of the solid waste is attained. In particular, by utilizing the thermocouple 68, the status of the incineration by microwave energy can be monitored, such that prior to attaining the incineration/combustion temperature, a low exhaust speed, and low exhaust volume flow is provided, thereby allowing the microwave energy to effectively heat the solid waste and increase the temperatures to initiate incineration. Once combustion begins, the sensor 68 causes the controller 72 to increase the speed of fan 24, thereby increasing the exhaust volume flow and correspondingly increasing the amount of air provided to the tube 13 to feed the combustion. A CPU or solid state control panel 51 is provided for controlling various operations in the STM such as valve openings, operation of the ram, and possibly for any interface and/or control of the optional LTM. The control panel can also be equipped with various system sensors, or indicators informing the user of any malfunctions or the need for servicing. The solid state control panel can also provide for control, or adjustment of the control, for the variable speed exhaust fan. By way of example, the variable speed fan is currently controlled utilizing a thermocouple such that a flow of 100-150 CFM is provided at temperatures below 220° F.; with 150-300 CFM provided for temperatures of 220°-500° F.; and with 300-400 CFM at temperatures exceeding 500° F. However, different ranges, or a different number of ranges may also be possible within the scope of the present invention.

Any small ash remnants and unburned solid particles become trapped in the filter 62 (which preferably includes a ceramic filter medium, such as a ceramic fabric) as the air passes through the tube 13 and into the exhaust manifold 64. Preferably, the filter 62 is within the microwave reactor chamber 12, such that any unburned particles remaining after a given microwave cycle can be incinerated in a subsequent microwave cycle.

As should be readily recognized, the solid treatment module STM provides a compact arrangement which can be readily installed, requiring only the connection of the waste influent inlet 52, an exhaust outlet 74, the liquid outlet 60 and condensate drain 66. Thus, the solid treatment module can be installed rapidly, with a target time for a single workman of less than four hours.

As shown in FIG. 2, an outer housing 12a is provided for the microwave reactor chamber 12, with an air inlet grille 12b allowing initial inlet of air for circulating between the housing 12a and chamber 12 as indicated by arrows. The air thus cools the electrical components (e.g., the magnetrons which generate microwaves) and then enters the ceramic tube and finally exits through the exhaust vent via manifold 64.

Figure 3A:
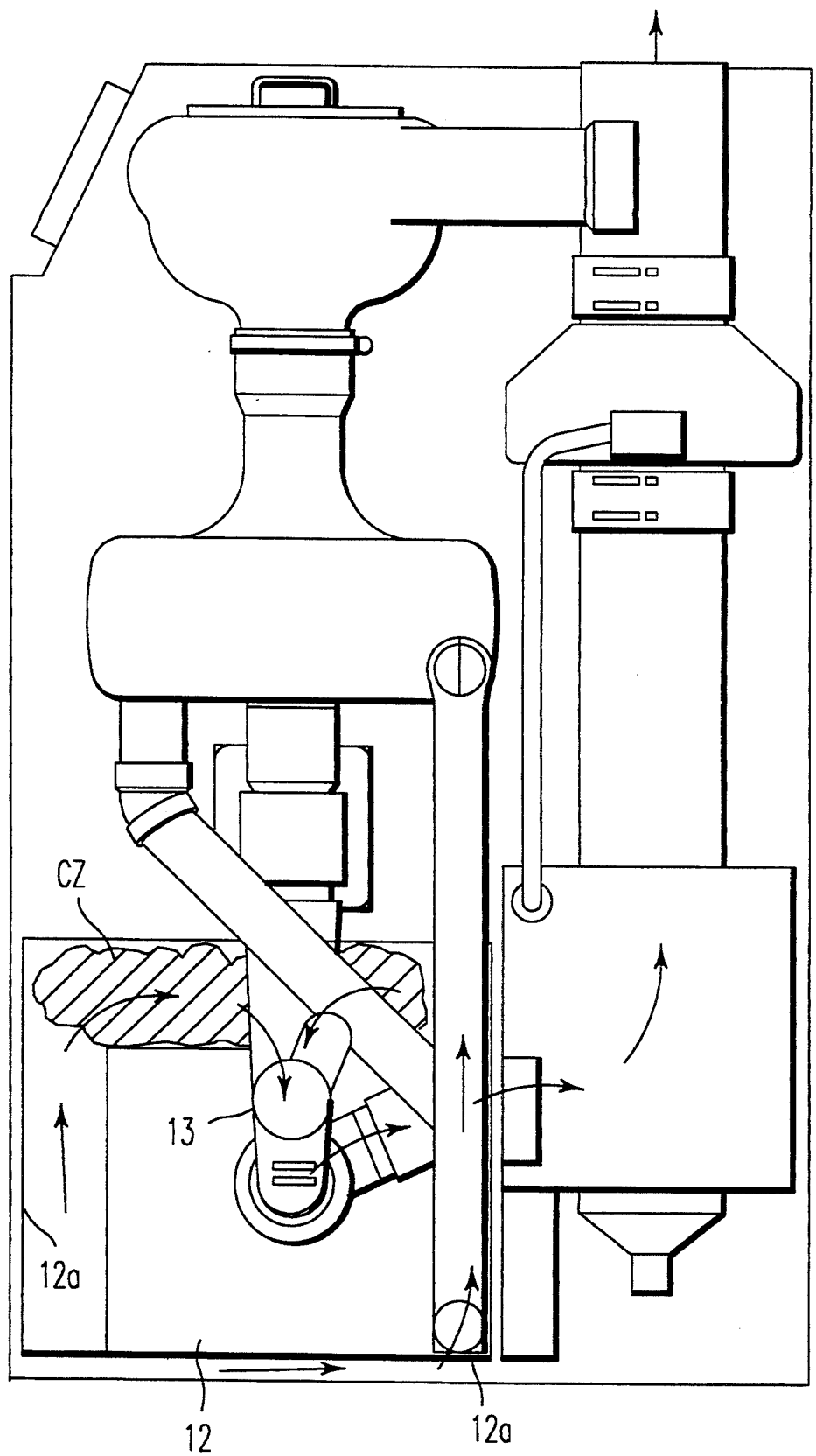
FIGS. 3 A-C are respective right, left and rear views of the solid treatment module of FIG. 2.
Figure 3B:
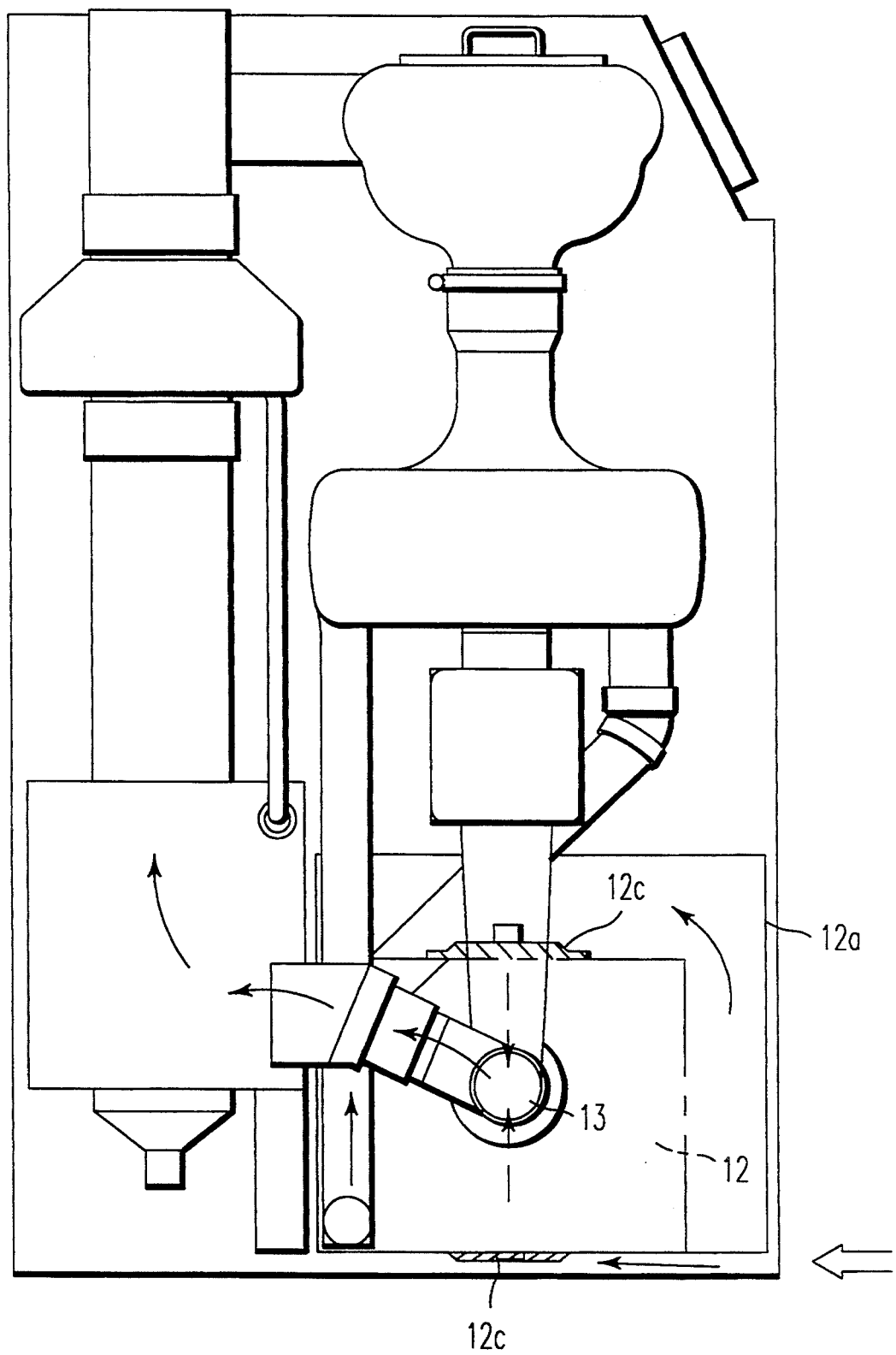

FIG. 3A is a view of the right side of the STM (i.e., viewed from the direction indicated by arrow A in FIG. 2) in order to further illustrate the air/exhaust flow. As shown in FIG. 3A, air passes between the chamber 12 and outer housing 12a, and then enters openings in the pipe feeding the solid waste or the fire tube 13 to provide air for combustion of the solid waste. The shaded region CZ represents a cooling zone at which electronic components can be cooled. FIG. 3B provides a further illustration (viewed from the direction of arrow B in FIG. 2) of the air/exhaust flow. FIG. 3B also illustrates the location of magnetrons 12c (each, e.g., 400 W magnetrons), such that microwaves are directed upon the fire tube 13, with the airflow cooling the magnetrons prior to feeding the combustion/incineration of the solid waste.

Figure 3C:
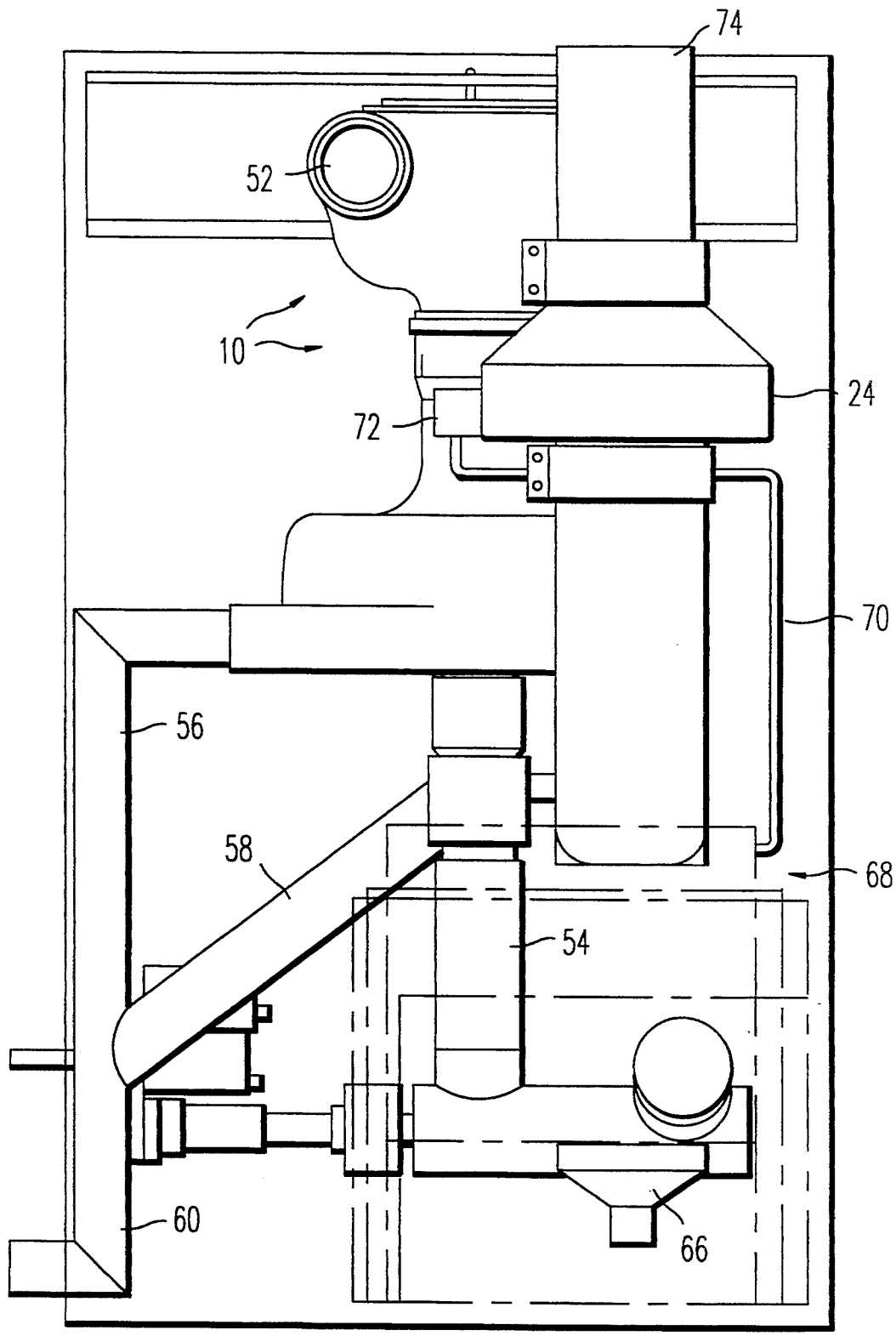

FIG. 3C is a rear view of the arrangement shown in FIG. 2, and is provided merely as a further illustration of the layout of the solid treatment module.

Figure 4:
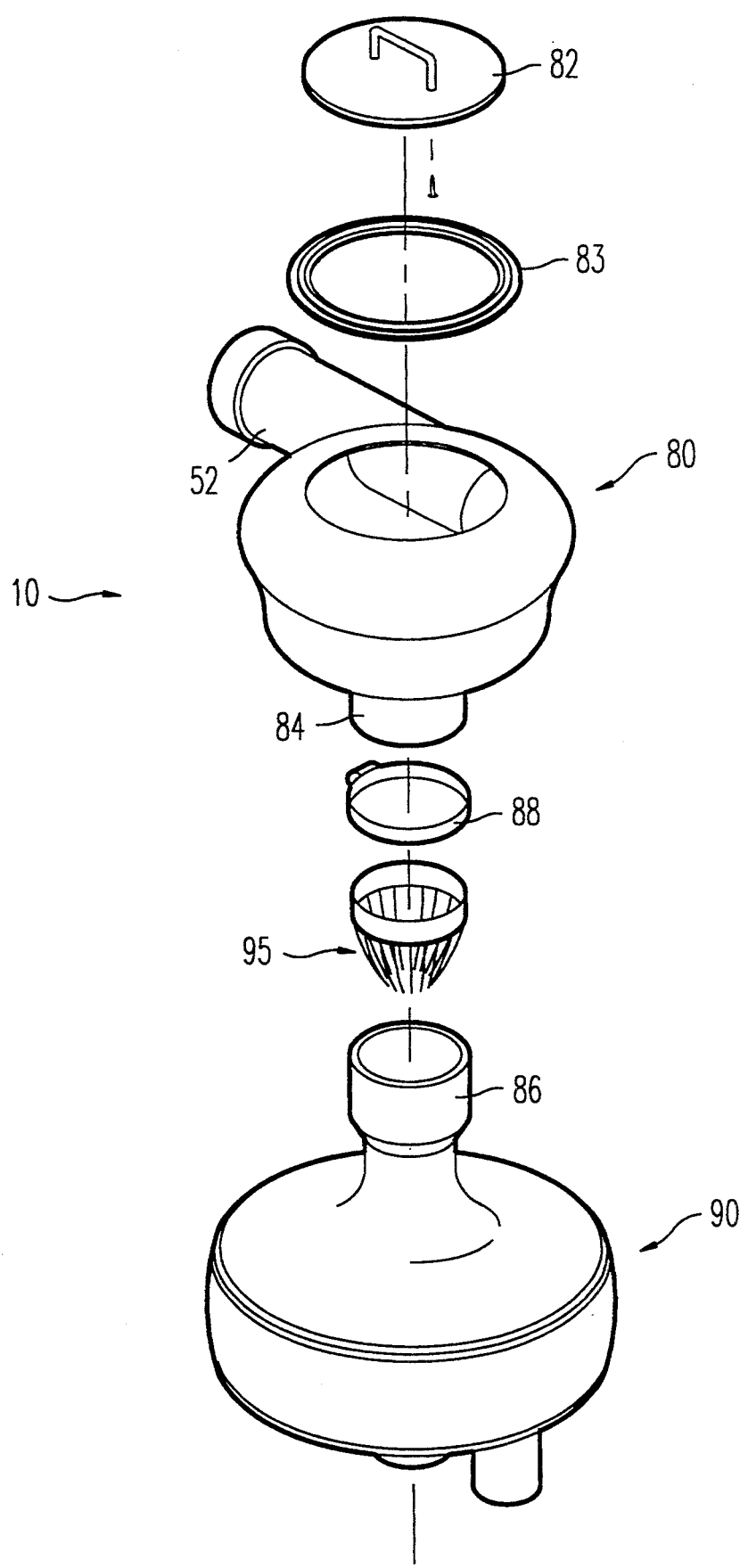
FIG. 4 is a perspective view of a disassembled separator of the present invention.

Referring now to FIG. 4, a perspective view of a disassembled separator 10 is shown. The separator unit 10 includes an upper separator or chamber 80, with a lower housing or lower chamber 90 provided which directs the respective components to the solid outlet and the primary and secondary liquid outlet tubes. A removable cover 82 encloses the upper housing 80 with a gasket seal 83. The cover 82 is desirable to allow for inspection, and removal of undesirable foreign objects from the separator, such as upon the occurrence of an inadvertent introduction of a hairbrush or child's toy into the toilet. The upper and lower portions 80, 90 are readily assembled, with an outlet pipe 84 of the upper portion received by an inlet part of the lower housing 90, and with the portion 86 enlarged to allow the pipe 84 to be received therein. A clamping ring 88 maintains a secure interconnection between the upper and lower housing portions 80, 90. Although the unit 10 could be formed integrally, the use of separate sections can be desirable, since the upper and lower housing parts 80, 90 can be rotated with respect to one another prior to fixing their respective positions with clamp ring 88, thereby aiding connection of the inlet pipe 52 with preexisting drain pipes in a residence or other installation location.

A wire spring member 95 is provided between the housing portions, 80, 90, the purpose of which will be explained hereinafter with reference to FIG. 5. Still referring to FIG. 4, it should be appreciated that the inlet pipe 52 supplies influents substantially tangential to the inner surface of the upper housing portion 80. Typically, the influents enter with a substantial velocity, usually by virtue of the gravity flow of a toilet or sink down to a basement location where the unit would typically be installed. A centrifugal flow is thus established as the influent exits the pipe 52 and travels along the inner surface of the upper housing portion 80.

Figure 5:
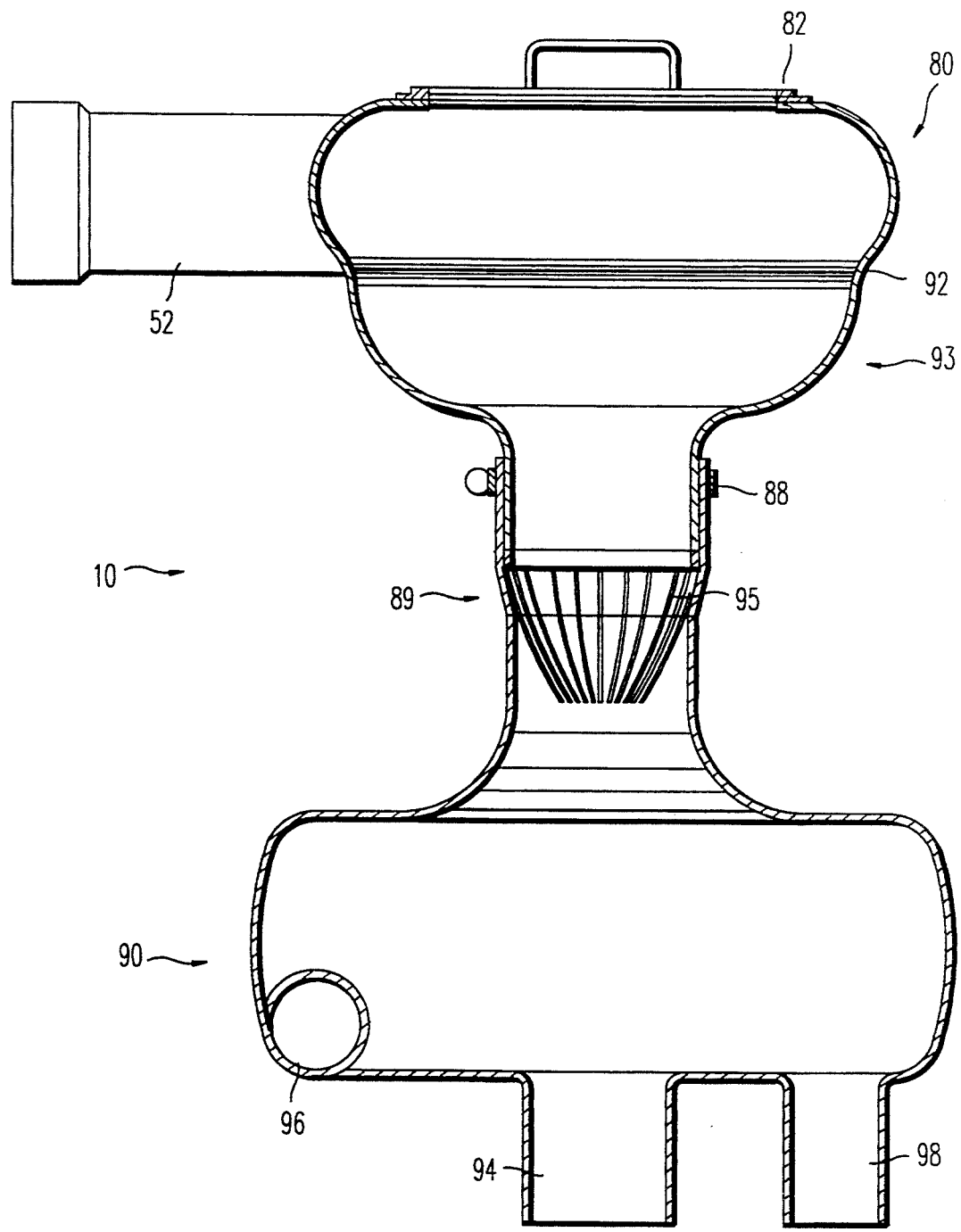
FIG. 5 is a side cross-sectional view of the separator of FIG. 4 in the assembled condition.

Referring now to FIG. 5, a side view of the separator is shown in cross-section, with the separator 10 in the assembled condition. As shown in FIG. 5, the separator has upper and lower chambers 80, 90 separated by a necked portion 89. As should be apparent from the description herein, the incoming flow is separated in the upper portion 80 (which therefore may also be referred to as a separating chamber), and the necked portion 89 further ensures separation of the liquids and solids by providing an acceleration zone such that the combined centrifugal, coriollis and syphoning surface tension effects provide a pulling action for separation of the falling liquids from the solids, and with the separate flows exiting the lower portion or lower chamber 90 (which may also be referred to as an outlet flow directing chamber). The inlet pipe 52 enters the upper housing portion 80 substantially tangential to the inner surface thereof. The influent thus enters the upper housing portion 80 and begins traveling in a downward helical pattern as a result of the velocity which tends to maintain the flow along the inner periphery of the housing, with gravity tending to draw the flow downwardly. Briefly returning to FIG. 4, it should be appreciated that, when viewing operation of the separator from an elevated position (i.e., looking downwardly), a clockwise flow would be observed. If the separator 10 were to be utilized south of the Equator, the inlet pipe 52 would be positioned with respect to the upper portion 80 such that a counterclockwise flow results, such that the flow is coordinated with the earth's rotation (i.e., the flow along the inner surface of the separator 10 is coordinated with the coriolis forces).

Returning to FIG. 5, in accordance with another aspect of the present invention, it has been recognized that the establishment of the flow along the inner periphery of the upper housing portion 80, together with an inflection 92 or bump 92 provided along the inner periphery causes the solid portions to be thrown toward the center of the separator. The inflection 92 is formed by reducing the diameter of the chamber 80 at 92, with the rate of diametric reduction per axial length greater at 92 than portions 93 therebelow. As a result, the solid waste drops vertically for exit through exit pipe 94, while the centrifugal forces acting upon the liquid maintain the liquid flowing in a helical pattern along the inner periphery of the separator 10 for exit through the primary and secondary outlets 96, 98. As shown in FIG.5, the lower chamber 90 includes a bottom wall that is generally planar. The outlets 96, 98 are respectively connected to the PVC pipes 56, 58 discussed hereinearlier with reference to FIG. 2.

As should be readily apparent, the separator 10 requires no energy, but provides a high degree of separation between liquid and solid components of the waste entering through inlet pipe 52. For example, for a four gallon toilet flush, less than ½ teaspoon of liquid has been found in the solid exit. The velocity of the liquid maintains flow of the liquid along the inner periphery of the separator, with the liquids sheeting along the inner surface. In addition, due to the smooth profile of the inner surface, including the reduced diameter portion at 92, solid waste is not emulsified (which could cause solid wastes to become suspended in the liquid), and the reduced diameter portion 92 causes the solid waste to be thrown toward the radial center of the separator 10. Below the reduced diameter portion 92, the diameter further reduces, however the rate of diameter reduction per vertical length is reduced in the portion indicated at 93 as compared with the portion at 92. As a result of the construction shown in FIG. 5, the solid waste is thrown toward the center of the separator, and exits through solid outlet 94 without significantly emulsifying, with the flow of liquid maintained about the inner periphery of the separator for exiting through liquid outlets 96, 98.

Primary and secondary outlets 96, 98 are provided for the liquid components, since it has been recognized that, particularly under large volume conditions, for example where multiple toilets are flushed simultaneously, the primary outlet pipe 96 is insufficient to accommodate the entire liquid flow. Thus, without providing a secondary liquid outlet pipe 98 at the outer periphery of the bottom of the lower housing portion 90, some of the liquid which is not able to pass out through the primary outlet 96 could be allowed to settle down and pass through the solid waste outlet 94. This problem is solved by the provision of the secondary liquid outlet 98. Thus, the solid waste which is thrown into the center of the separator 10 by the reduced diameter portion or bump 92 is allowed to pass through the exit 94 with only a small amount of liquid entrained therein.

As discussed earlier, a wire spring arrangement 95 is disposed between the upper and lower housing portions 80, 90. The wire spring arrangement 95 assists in maintaining the solid waste material separate from the liquid flow which is traveling along the inner periphery of the separator 10. The wire spring arrangement 92 is particularly important for maintaining light solid material, such as toilet paper and other paper products, since such materials can have a tendency to rejoin the liquid and flow along the inner surface of the separator 10.

As shown in FIG. 5, a necked portion 89 is provided between the upper and lower chambers. The necked portion is advantageous for several reasons. First, it provides a joint such that the upper and lower chambers 80, 90 may be rotated with respect to one another (i.e., after releasing clamp 88). This allows for adjustment of the inlet to the STM to ease installation at various locations. The housing of the STM will include knockouts to allow, e.g., four inlet pipe configurations (i.e., top, right side, rear, left side), and the neck allows the orientation of the inlet 52 to be readily adjusted. In addition, the neck can allow for separation of the chambers 80, 90 for servicing and/or cleaning/replacement of the guide ring 95. However, it is believed that separation of the upper and lower chambers will rarely be necessary.

The necked portion 89 also provides an acceleration zone at which descending liquids (i.e., liquids adhering to the sidewall surfaces of the upper chamber) will "free fall." Thus, the combined centrifugal, coriollis, and syphoning surface tension effects provide a pulling action ensuring separation of the falling liquids from the solids which are guided into the central area of the lower chamber. The necked portion also assists in providing an overall profile for the separator components which can be economically molded, for example of high density polyethylene or other polymer materials.

FIG. 5 was prepared as a scale drawing of an actual working embodiment, however, it is to be understood that varying sizes and dimensions could also be utilized. For residential use, the separator of FIG. 5 has been designed such that it can readily accommodate typical, even somewhat unusual waste flow rates. For example, the separator 10 should be capable for handling simultaneous flushing of three toilets. Further, by way of example, a separator in which the upper chamber 80 has a maximum diameter of 18 inches, with the lower chamber 90 having a maximum diameter of 20 inches, and with the sidewall of the lower chamber 90 having a height of approximately 8 inches, has been found suitable for accommodating and effectively separating such volumes. However, varying dimensions can be utilized depending upon the anticipated volume requirements for a particular installation. For example, where larger volume requirements are needed, the height of the sidewall of the chamber 90 could be increased, while retaining the remaining dimensions. For much greater volume requirements, other dimensions may additionally need modification.

Figure 6:
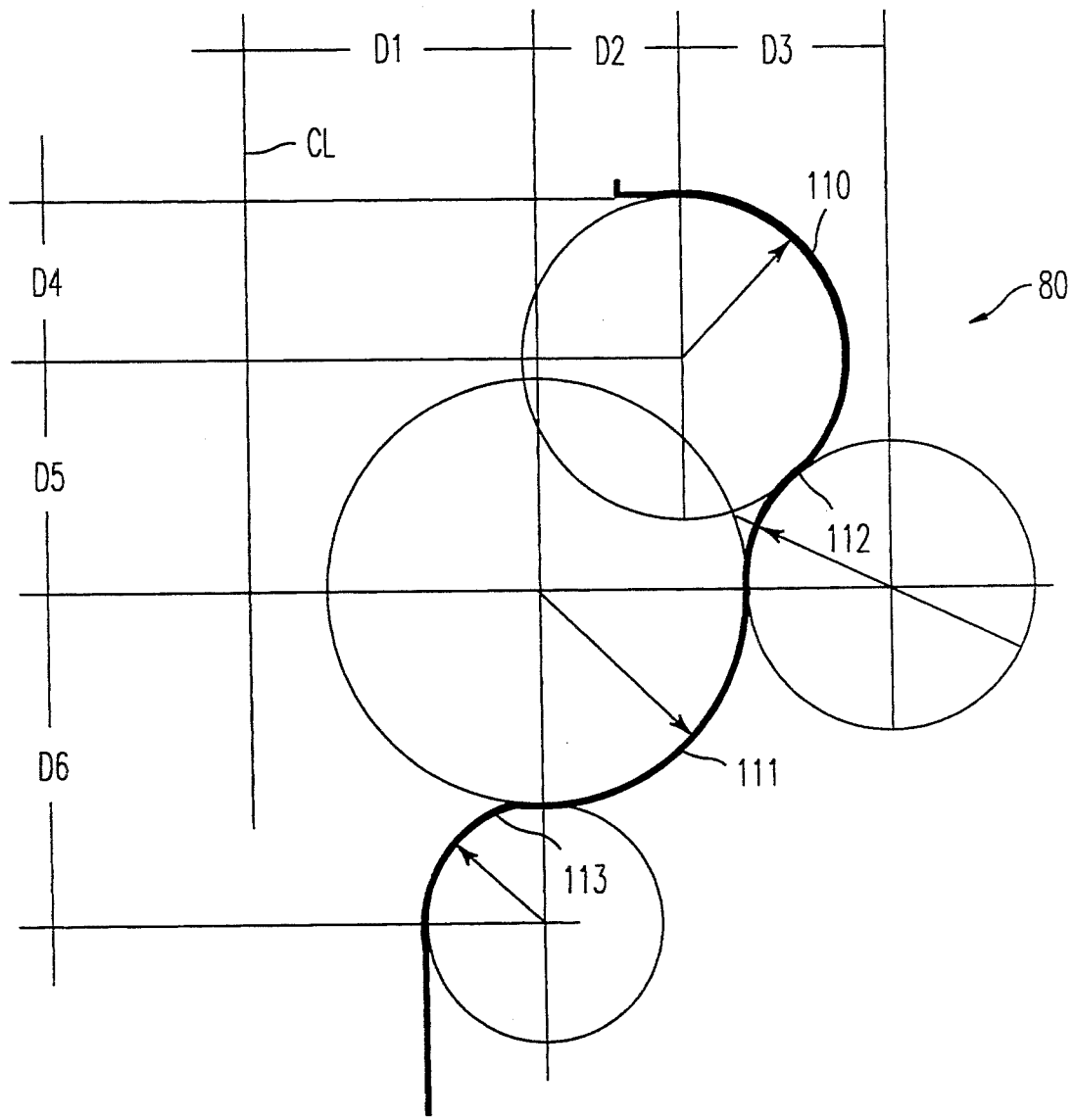
FIG. 6 illustrates the profile of the upper chamber of the separator.

As further illustrated in FIG. 6, the profile of the upper chamber 80 can be formed of essentially four contours 110-113, each of which has a cross-section which is a segment of a circle. As shown, the axes of the contours 110, 111 are within the separator, while the axes of contours 112, 113 are outside the separator. Thus, as shown in FIG. 6, a curved portion 112 can be utilized to provide a reduced diameter portion or inflection portion of the separator (see, e.g. reduced diameter portion 92 discussed herein with reference, e.g. to FIG. 5). As shown in FIG. 6, the curved portion 112 can be formed with a radius external to the separator when viewed in vertical cross-section. Similarly, the curved portions 110, 111 can be formed with interior radii, with the curved portion 113 having an external radius and providing a transition to the necked portion 89 of the separator. CL designates the center line of the separator, and the respective dimensions D1–D6 can be as follows:

D1 3.25"
D2 1.50"
D3 2.25"
D4 1.75"
D5 2.50"
D6 3.50"

Of course, the foregoing dimensions are provided as an illustration, and in the interest of completeness, but should not be construed as limiting. As shown in FIG.6, the separator has a continuous inner surface defining a first reduced diameter portion formed by contour 112, and a second reduced diameter portion formed by contour 111. Contour 112 also defines a first convex surface facing an inside of the separating chamber at the first reduced diameter portion, and contour 111 defines a second concave surface facing an inside of the separating chamber at the second reduced diameter portion.

As should be readily apparent from the foregoing, the present invention provides a highly effective system and process for handling materials, particularly in treating waste, thus greatly simplifying waste disposal, while reducing costs, and providing more environmentally acceptable effluents.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A treatment system for treating materials which include solid and liquid components comprising:
   a separator for separating an incoming flow into at least first and second components such that said first component includes primarily solids and said second component includes primarily liquids;
   said separator including:
   opposed top and bottom ends;
   an inlet disposed at a top portion adjacent said top end of said separator for introducing the incoming flow into the top portion of said separator;
   a solid outlet and a separate liquid outlet for respectively removing solids and liquids from a bottom portion of said separator adjacent said bottom end, said solid outlet and said separate liquid outlet each extending from the bottom portion of said separator;
   a separating chamber at said top portion for receiving said incoming flow entering through said inlet, said separating chamber having a continuous inner surface receiving said incoming flow, said separating chamber further including a first reduced diameter portion disposed below said inlet, said first reduced diameter portion having a reduced diameter relative to an inlet portion of said separating chamber at which said incoming flow enters said separating chamber, said continuous inner surface defining a first convex curved surface facing an inside of said separating chamber at said first reduced diameter portion, said separating chamber further including a second reduced diameter portion disposed adjacent and below said first reduced diameter portion and having a reduced diameter relative to said first reduced diameter portion, said continuous inner surface defining a second concave curved surface facing the inside of said separating chamber at said second reduced diameter portion, whereby solids are deflected by said first reduced diameter portion toward a center of said separating chamber and liquids flow along said inner surface;

wherein said separator further includes an outlet flow directing chamber disposed between said separating chamber and said bottom end, said outlet flow directing chamber including said solid outlet extending from a bottom wall at said bottom end of said separator, said outlet flow directing chamber further including said liquid outlet disposed adjacent a side wall of said outlet flow directing chamber;

wherein a necked portion is disposed between said separating chamber and said outlet flow directing chamber, and wherein inner surfaces of said separator extend continuously through said separator, necked portion and said outlet flow directing chamber; and wherein said necked portion has an inner diameter which is less than maximum diameters of both said separating chamber and said outlet flow directing chamber.

2. The treatment system of claim 1, wherein said separator is symmetrical about a center axis and said solid outlet is disposed at a center of said bottom wall of said outlet flow directing chamber, and said liquid outlet is radially spaced from said solid outlet.

3. The treatment system of claim 2, further including a second liquid outlet extending from said outlet flow directing chamber.

4. The treatment system of claim 1, wherein said liquid outlet is adjacent both said side wall and said bottom wall of said outlet flow directing chamber.

5. The treatment system of claim 1, wherein said liquid outlet communicates with a liquid treatment system having at least one filter for removing suspended solids from liquids exiting from said separator, said liquid treatment system further including means for subjecting said at least one filter to microwave energy.

6. The treatment system of claim 1, further including a microwave reactor chamber connected to a solid outlet of said separator, such that said microwave reactor chamber receives said first component, and incinerates said first component by subjecting said first component to microwaves;

a liquid treatment system for receiving said second component, said liquid treatment system including a filter for removing solids suspended in said second component, and treatment means for subjecting said second component to further purification after exiting said filter.

7. The treatment system of claim 6, wherein said liquid treatment system further includes means for subjecting said filter to microwaves.

8. The treatment system of claim 7, wherein a pair of said filters are provided, each having a respective microwave generator associated therewith, and wherein a diverter valve is provided between said separator and said pair of filters, whereby during operation of a microwave generator associated with one of said filters, liquid exiting said separator is directed to the other of said pair of filters.

9. The treatment system of claim 1, further including a spring arrangement disposed in said necked portion.

10. A treatment system for treating materials which include solid and liquid components comprising:

a separator for separating an incoming flow into at least first and second components such that said first component includes primarily solids and said second component includes primarily liquids;

said separator including:

opposed top and bottom ends;

an inlet adjacent said top end;

a separating chamber having an inlet portion receiving said incoming flow entering through said inlet, said inlet portion having a continuous inner surface receiving said incoming flow, said separating chamber further including a first reduced diameter portion disposed below said inlet portion and having a reduced diameter relative to said inlet portion, whereby solids are deflected by said first reduced diameter portion toward a center of said separating chamber and liquids flow along the inner surface; and said separator further including an outlet flow directing chamber disposed between said separating chamber and said bottom end, said outlet flow directing chamber including a solid outlet extending from a bottom wall of said outlet flow directing chamber at said bottom end of said separator, said bottom wall being generally planar, said outlet flow directing chamber further including first and second liquid outlets, said first liquid outlet adjacent a sidewall of said outlet flow directing chamber and adjacent said bottom wall, and wherein said second liquid outlet is radially spaced from said solid outlet, said second liquid outlet extending from said bottom wall.

11. The treatment system of claim 10, wherein said separator includes a necked portion disposed between said separating chamber and said outlet flow directing chamber, said first liquid outlet extending tangentially to said sidewall of said outlet flow directing chamber.

12. A treatment system for treating materials which include solid and liquid components comprising:

a separator for separating an incoming flow into at least first and second components such that said first component includes primarily solids and said second component includes primarily liquids;

said separator including:

opposed top and bottom ends;

an inlet disposed at a top portion adjacent said top end of said separator for introducing the incoming flow into the top end of said separator;

a solid outlet and a separate liquid outlet for respectively removing solids and liquids from a bottom portion of said separator adjacent said bottom end, said solid outlet and said separate liquid outlet each extending from the bottom portion of said separator;

a separating chamber at said top portion for receiving said incoming flow entering through said inlet, said separating chamber having a continuous inner surface receiving said incoming flow, said separating chamber further including a first reduced diameter portion disposed below said inlet, said first reduced diameter portion having a reduced diameter relative to an inlet portion of said separating chamber at which said incoming flow enters said separating chamber, said continuous inner surface defining a first convex curved surface facing an inside of said separating chamber at said first reduced diameter portion, said separating chamber further including a second reduced diameter portion disposed adjacent and below said first reduced diameter portion and having a reduced diameter relative to said first reduced diameter portion, said continuous inner surface defining a second concave curved surface facing the inside of said separating chamber at said second reduced diameter portion, whereby solids are deflected by said first reduced diameter portion toward a center of said separating chamber and liquids flow along said inner surface;

the system further including an incinerator arrangement downstream of said separator which communicates with said solid outlet.

13. The treatment system of claim 12, wherein said incinerator arrangement includes a microwave reactor chamber, and wherein said separator includes a solid outlet which communicates with said microwave reactor chamber.

14. The treatment system of claim 12, further including means for varying airflow through said incinerator arrangement.

15. A treatment system for treating materials which include solid and liquid components comprising:

a separator for separating an incoming flow into at least first and second components such that said first component includes primarily solids and said second component includes primarily liquids;

said separator including:

opposed top and bottom ends;

an inlet adjacent said top end; and a separating chamber having an inlet portion adjacent said top end receiving said incoming flow entering through said inlet, said inlet portion having a continuous inner surface receiving said incoming flow, said separating chamber further including a first reduced diameter portion disposed below said inlet portion and having a reduced diameter relative to said inlet portion, whereby solids are deflected by said first reduced diameter portion toward a center of said separating chamber and liquids flow along the inner surface;

the treatment system further including an incinerator arrangement downstream of said separator, said incinerator arrangement including a microwave reactor chamber, and wherein said separator includes a solid outlet at said bottom end which communicates with said microwave reactor chamber, the treatment system further including a variable speed exhaust fan downstream of said microwave reactor chamber.

16. The treatment system of claim 15, further including control means for varying the speed of said exhaust fan.

17. The treatment system of claim 16, further including a thermocouple connected to said control means such that said control means varies exhaust flow with temperature.

18. A treatment system for treating materials which include solid and liquid components comprising:

a separator for separating an incoming flow into at least first and second components such that said first component includes primarily solids and said second component includes primarily liquids;

said separator including:

opposed top and bottom ends;

an inlet adjacent said top end; and a separating chamber having an inlet portion adjacent said top end receiving said incoming flow entering through said inlet, said inlet portion having a continuous inner surface receiving said incoming flow, said separating chamber further including a first reduced diameter portion disposed below said inlet portion and having a reduced diameter relative to said inlet portion, whereby solids are deflected by said first reduced diameter portion toward a center of said separating chamber and liquids flow along said inner surface;

the treatment system further including an incinerator arrangement downstream of said separator, wherein said incinerator arrangement includes a microwave reactor chamber for subjecting solid waste to microwaves, and wherein said separator includes a solid outlet at said bottom end which communicates with said microwave reactor chamber, said system further including an airflow system having an airflow path which extends about at least a portion of said microwave reactor chamber and then enters said microwave reactor chamber, said airflow path also extending out of said microwave reactor chamber to an outlet exhaust pipe.

19. The treatment system of claim 18, further including a holding tube within said microwave reactor chamber for holding solid waste during microwave treatment.

20. The treatment system of claim 19, further including an exhaust manifold chamber downstream from said microwave reactor chamber, and wherein a temperature sensor is disposed in said exhaust manifold chamber, and further wherein said temperature sensor is coupled to control means for controlling operation of a variable speed exhaust fan, such that speed of said exhaust fan is varied with temperature sensed in said manifold chamber.

21. A treatment system for treating materials which include solid and liquid components comprising:

a separator for separating an incoming flow into at least first and second components such that said first component includes primarily solids and said second component includes primarily liquids;

said separator including:

opposed to and bottom ends;

an inlet; and a separating chamber having an inlet portion adjacent said top end receiving said incoming flow entering through said inlet, said inlet portion having a continuous inner surface receiving said incoming flow, said separating chamber further including a first reduced diameter portion disposed below said inlet portion and having a reduced diameter relative to said inlet portion, whereby solids are deflected by said first reduced diameter portion toward a center of said separating chamber and liquids flow along said inner surface;

the treatment system further including a microwave reactor chamber connected to a solid outlet at said bottom end of said separator, such that said microwave reactor chamber receives said first component, and incinerates said first component by subjecting said first component to microwaves;

a liquid treatment system for receiving said second component, said liquid treatment system including a filter for removing solids suspended in said second component, and treatment means for subjecting said second component to further purification after exiting said filter, wherein said liquid treatment system further includes means for subjecting said filter to microwaves, and wherein a pair of said filters are provided, each having a respective microwave generator associated therewith, and wherein a diverter valve is provided between said separator and said pair of filters, whereby during operation of a microwave generator associated with one of said filters, liquid exiting said separator is directed to the other of said pair of filters; and wherein liquid exiting said filters enters a holding tank, said holding tank including a dosing siphon for feeding a predetermined amount of liquid from a reservoir in said holding tank to an electrolysis oxidant cell for purifying said liquid.

22. The treatment system of claim 21, further including an ultraviolet treatment system downstream of said electrolysis cell.

* * * * *